June 15, 1943.  R. R. MILLER  2,322,046
SERVING IMPLEMENT
Filed Oct. 19, 1940
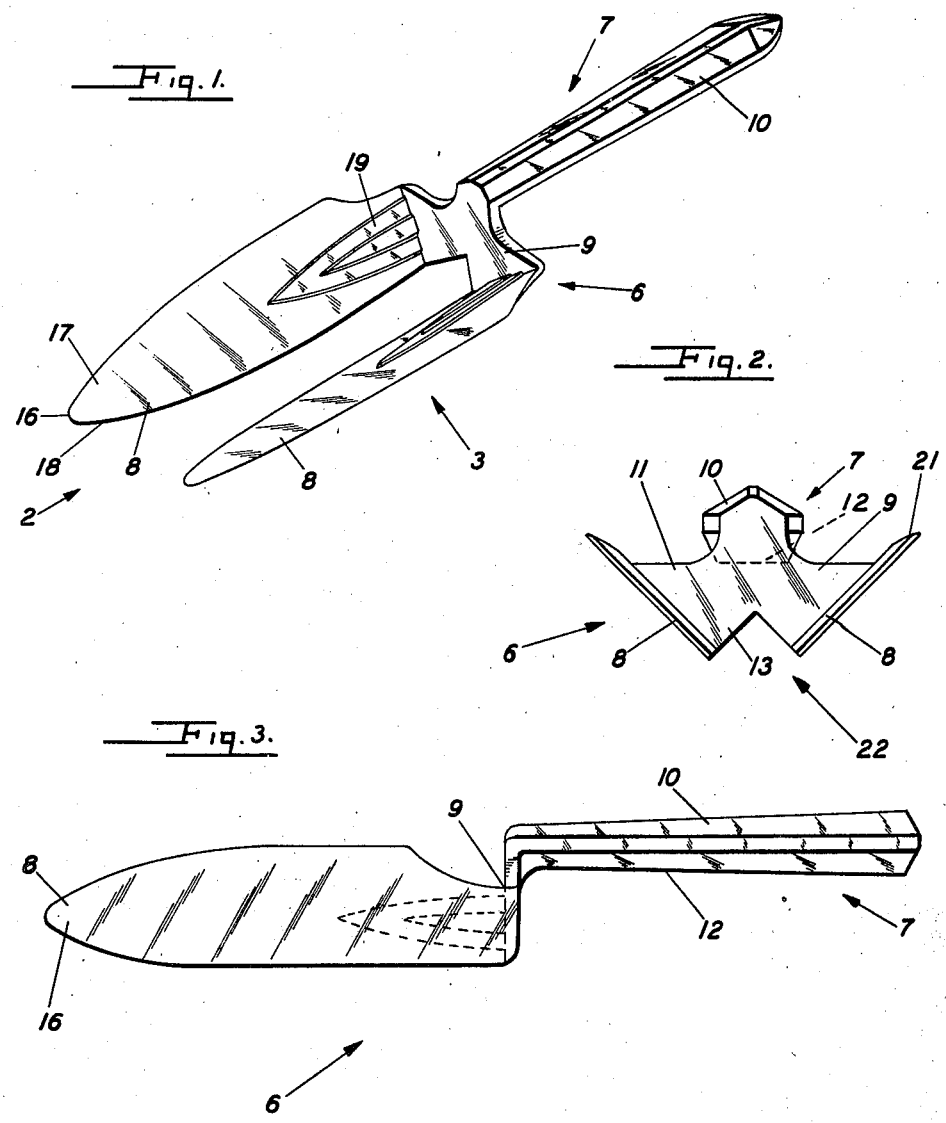
INVENTOR.
ROYAL R. MILLER
BY
His Attorney.

Patented June 15, 1943

2,322,046

UNITED STATES PATENT OFFICE 2,322,046

SERVING IMPLEMENT

Royal R. Miller, Los Angeles, Calif.

Application October 19, 1940, Serial No. 361,928

3 Claims. (Cl. 294—1)

This invention relates to kitchen and table articles and more particularly to implements used for serving articles of food.

An object of the invention is the provision of a cake server of novel construction and possessed of advantages over more conventionally constructed cake knives, which add materially to the convenience afforded by its use.

A more detailed object of my invention is the provision of a cake serving knife having two separate blades, preferably of identical form so that either blade can be used with equal facility by sliding it under a piece of cake to be served and to lift it, the other blade then functioning to steady the piece of cake and thereby preventing its falling off the lifting blade and aiding in preventing the piece of cake from falling apart as it is most apt to do when a cake of several layers is being served.

A further object is to incorporate details of construction and design into the blades which enhance their flexibility and thereby aid in sliding either of the blades under the piece of cake to be served.

Another object of my invention is to provide a serving implement of the general character described, so designed that it lends itself to production in quantities at low cost, preferably being cast in one piece in one of the modern self-hardening plastics which results in the production of an article of highly attractive appearance, convenient to use and capable of being kept clean and sanitary with the utmost facility.

The invention possesses other objects and valuable features, some of which with those enumerated will be set forth in the following description of the preferred embodiment of my invention illustrated in the drawing accompanying and forming a part of the specification. It is to be understood that I do not limit myself to the showing made by the said drawing and description as I may adopt variations of the preferred embodiment within the scope of my invention as set forth in the claims.

Referring to the drawing,

Fig. 1 is a perspective view of a cake knife incorporating the principles of the present invention;

Fig. 2 is a view in end elevation, the direction of view being indicated by the arrow 2 of Fig. 1;

Fig. 3 is a view in side elevation taken in the direction of the arrow 3 of Fig. 1.

In terms of broad inclusion the device of the present invention comprises a hilt or handle portion having a pair of blades mounted thereon and extending therefrom with their major axes substantially parallel but in planes inclined with respect to each other. By providing blades of substantially identical configuration either can be used to be slid under and to lift a piece of cake to be served, whereupon the other blade serves as a guide or abutment which facilitates retaining the piece of cake upon the lifting blade and serves to prevent the piece of cake from falling apart, this feature being particularly desirable when a cake of several layers is being served.

More specifically described, the preferred embodiment of my improved cake knife is illustrated in its entirety at 6 and comprises a hilt portion 7 having two blades 8 extending therefrom in planes disposed obliquely with respect to each other. Whereas any suitable material may be employed for the construction of my cake knife, I prefer that one of the modern self-hardening plastics now currently popular be employed for this purpose for the reason that this material lends itself to quantity production by die casting at relatively low cost and produces an article of adequate strength and durability with a finish so smooth and impervious that it facilitates keeping the article clean and sanitary; also this material can be produced in numerous bright and attractive colors, thereby adding very materially to the sales value and public appeal of the finished article.

Another advantage of employing this type of material is that it produces an article of integral unitary construction which further facilitates sanitation and reduces cost of manufacture.

The hilt portion 7 comprises a grip or handle 10 having a cross member 9 at the forward end thereof extending laterally to both sides, preferably however, being offset downwards to such an extent that the upper edge 11 of the cross member 9 is substantially flush with the undersurface 12 of the handle 10 and the lower edge 13 is spaced a material distance below the undersurface 12 of the handle. This permits disposition of the two blades 8 which extend forward from the lateral extremities of the cross member 9 substantially below the axis of the handle 10 which, of course, increases the convenience with which the device can be used by placing the center of gravity of it and its load materially below the handle.

The two blades 8 preferably are of identical construction which permits them to be used interchangeably, i. e., either blade can be used to be slid under the piece of cake to be served whereupon the other blade extends upwards along the cut side of the piece and serves to guide and support it in such a manner as to facilitate its retention upon the lifting blade and also serves to prevent the piece of cake from falling apart.

Toward this same end it is preferred that the angle between the planes of the two blades 8 shall be approximately a right angle inasmuch as this permits one of the blades to extend substantially vertically upwards along the other side of the piece of cake, while the bottom of the piece rests upon the other blade.

The blades 8 are preferably relatively thin so as to enhance their inherent resilient flexibility. This is desirable because it facilitates sliding a blade under the piece of cake to be served—particularly if the greatest flexibility in the blade occurs adjacent its outer end or point 16. To serve the double purpose of enhancing the ornamental appearance of the article and of insuring that the greatest flexibility will occur at this location. The blades preferably are so constructed that the cross sectional area of each gradually diminishes towards the outer ends 16. This is accomplished both by having the side edges 17 and 18 gradually converge towards the point 16 and also by providing ornamental bosses, i. e., relatively thickened portions 19 upon the face of the blade adjacent its point of connection to the cross member 9.

To further facilitate slipping a blade under the piece of cake to be served, it is preferred that the outer edge 17 be chamfered or bevelled as indicated at 21.

Attention should be directed to the relatively wide space between the proximal edges 18 of the two opposed blades 8, thus leaving a relatively wide opening 22 between the blades. The purpose of this is to permit the blade which is being slid under the piece of cake to be flexed a material distance upward before it reaches the lowest horizontal plane passing through the blade which is then vertical. This desirable feature is further enhanced by the tapering configuration of the blade wherein the two opposed inner edges 18 diverge from each other as they approach the outer ends of their respective blades.

I claim:

1. A cake serving knife of the character described, of integral, unitary construction, cast in one piece of self-hardening plastic material resiliently flexible after solidification, said knife comprising a hilt and a pair of blades, said hilt comprising a handle and a cross member extending downwards and laterally from one end of said handle and said blades extending forward from adjacent extremities of said cross member, the longitudinal axes of said blades being substantially parallel and the planes of said blades being disposed at substantially right angles with each other and said blades being of reduced cross-sectional area adjacent their outer ends whereby their outer ends bend more readily than their inner portions.

2. In a serving implement of the character described, a hilt comprising a handle and a cross member rigid therewith and extending downward and in both lateral directions therefrom, and a pair of blades mounted independently of each other on said cross member and extending forward therefrom with their longitudinal axes in substantially parallel relationship to each other, the planes of said blades being angularly disposed with respect to each other and said blades being more flexible adjacent their outer ends than adjacent said hilt.

3. In a serving implement of the character described, a hilt comprising a handle and a cross member rigid therewith and extending downward and in both lateral directions therefrom, and a pair of flexible, resilient blades mounted independently of each other on said cross member and extending forward therefrom with their longitudinal axes in substantially parallel relationship to each other, the planes of said blades being angularly disposed with respect to each other and the proximal longitudinal edges of said blades being spaced apart to permit upward flexing of either blade for a distance sufficient to facilitate sliding the flexed blade under a piece of cake before bringing its plane into intersection with any portion of the other of said blades.

ROYAL R. MILLER.